(12) United States Patent
Tourrilhes et al.

(10) Patent No.: US 11,153,192 B2
(45) Date of Patent: Oct. 19, 2021

(54) TECHNIQUES AND ARCHITECTURES FOR AVAILABLE BANDWIDTH ESTIMATION WITH PACKET PAIRS SELECTED BASED ON ONE-WAY DELAY THRESHOLD VALUES

(71) Applicant: Hewlett Packard Enterprise Development LP, Houston, TX (US)

(72) Inventors: Jean Tourrilhes, Palo Alto, CA (US); Puneet Sharma, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 76 days.

(21) Appl. No.: 16/805,730

(22) Filed: Feb. 29, 2020

(65) Prior Publication Data

US 2021/0273869 A1 Sep. 2, 2021

(51) Int. Cl.
*H04L 12/26* (2006.01)
*H04L 12/911* (2013.01)
*H04L 12/841* (2013.01)

(52) U.S. Cl.
CPC .......... *H04L 43/12* (2013.01); *H04L 43/0858* (2013.01); *H04L 43/0882* (2013.01); *H04L 43/16* (2013.01); *H04L 47/283* (2013.01); *H04L 47/70* (2013.01)

(58) Field of Classification Search
None
See application file for complete search history.

(56) References Cited

U.S. PATENT DOCUMENTS

| | | | |
|---|---|---|---|
| 6,445,681 B1 | 9/2002 | Pogrebinsky | |
| 8,738,986 B2 | 5/2014 | Srinivas et al. | |
| 2011/0149751 A1* | 6/2011 | Li | H04L 43/0882 370/252 |
| 2011/0205889 A1 | 8/2011 | Mingyu et al. | |
| 2013/0003594 A1* | 1/2013 | Amano | H04L 43/10 370/252 |
| 2013/0114421 A1* | 5/2013 | Qian | H04L 43/0852 370/252 |
| 2017/0324635 A1* | 11/2017 | Oshiba | H04L 43/0882 |
| 2020/0389381 A1* | 12/2020 | Oshiba | H04L 43/16 |

OTHER PUBLICATIONS

One-Way Delay Measurement: State of the Art, Vito et al, IEEE periodicals, 2008, pp. 2742-2750 (Year: 2008).*

(Continued)

*Primary Examiner* — Yaotang Wang
(74) *Attorney, Agent, or Firm* — Jaffery Watson Mendonsa & Hamilton (57) ABSTRACT

Techniques and architectures for measuring available bandwidth. A train of probe packets is received from a remote electronic device. A per-packet one-way delay (OWD) is calculated for at least two packets from the train of probe packets. An OWD threshold value is calculated based on the calculated OWD for the at least two packets from the train of probe packets. A packet pair is selected from the train of probe packets based on the per-packet OWD for each packet in the packet pair exceeding the OWD threshold value. An estimated available bandwidth is computed based on one or more transmission characteristics of the selected packet pair.

20 Claims, 6 Drawing Sheets

(56) References Cited

OTHER PUBLICATIONS

An End-to-End Technique to Estimate the Transmission Rate of an IEEE 802.11 WLAN, IEEE conference 2007, pp. 415-420 (Year: 2007).*
WBest: a Bandwidth Estimation Tool for IEEE 802.11 Wireless Networks, IEEE conference 2008, pp. 374-381 (Year: 2008).*
Path Capacity Estimation in Heterogeneous, Best effort, Small-scale IP Networks, IEEE conferences 2010, pp. 1076-1083 (Year: 2010).*
On the Performance of Packet-pair Based Path Capacity Estimation in Wireless Ad Hoc Networks, IEEE conference 2015, pp. 1-9 (Year: 2015).*
Carlucci et al., "Congestion Control for Web Real-time Communication", IEEE/ACM Transactions on Networking, May 2017, 15 pages.
Lin et al., "Estimating End-to-end Available Bandwidth with Noises", IEEE Access, vol. 5, Aug. 18, 2017, pp. 22584-22589.

\* cited by examiner

TECHNIQUES AND ARCHITECTURES FOR AVAILABLE BANDWIDTH ESTIMATION WITH PACKET PAIRS SELECTED BASED ON ONE-WAY DELAY THRESHOLD VALUES

BACKGROUND

Bandwidth measurement and estimation is an essential part of any network traffic engineering solution including, for example, software defined wide area network (SDWAN) solutions. It is useful to know how much capacity is available on each network path before deciding where to place/route and load balance the network traffic. It is also useful to know the available bandwidth to help a user or network administrator understand the current network condition.

In a closed system, it is possible to collect direct measurements on each network device of the traffic path. However, in many cases, it is not possible to use direct measurement. For example, when the network devices are in different administrative domains or when measurable characteristics are hidden by tunneling or encapsulation. This is the case for SDWANs that direct traffic over a best path utilizing the Internet, for example.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In electronic networks (whether wired or wireless) packets are utilized to transmit data. Networks can be configured to connect any number of endpoints, for example, any number of client devices and any number of server devices. In most networks there exist multiple possible paths between endpoints. Having multiple paths between endpoints improves resilience to failure and can increase network capacity. The ability to efficiently and accurately measure or estimate bandwidth is important for network management and administration in order to efficiently allocate network resources and provide optimal network performance. It is also useful to know the available bandwidth to help a user or network administrator understand the current network condition.

PathCos++ and Self-Loading Decreasing Rate Train (SL-DRT) are some of one of the state-of-the-art techniques for available bandwidth estimation. These techniques are based on sending a train of network probe packets with decreasing rate, and measuring the received probe packet rate between two packets of equal congestion. PathCos++, SLDRT and some other bandwidth estimation techniques use a Bump Detection Algorithm (BDA) for selecting those two points of equal congestion based on the characteristics of the packets received. However, the various Bump Detection Algorithms are quite sensitive to noise in packet timing and, in many cases, this noise prevents the algorithm to find the optimal pair of points, which leads to poor bandwidth estimates (i.e. larger errors in the estimate).

Described herein are novel techniques, architectures and approaches to better select points of equal congestion, with generally less One-Way Delay (OWD) noise. This dramatically improves the performance of bandwidth estimation techniques using techniques similar to PathCos++ and SLDRT.

Simple network traffic engineering involves having a primary link and a backup link that can be used in case of primary link failure. Multi-rooted trees, such as fat trees, are topologies that offer many parallel paths can be used in more complex network environments and have been extensively studied. Many approaches have been proposed to load balance packets in these types of topologies. The Internet is an even more complex network and is split across multiple entities and administrative domains. Thus, Internet-related traffic engineering is much more complex. In Internet applications each entity can be required to perform relatively advanced traffic engineering within its own domain and cross-domain interactions can be managed through Border Gateway Protocol (BGP) routing, for example, which allows only for fairly coarse traffic engineering. Thus, further improvements can be provided.

Most techniques for traffic engineering in complex network environment including the Internet are composed of three parts: 1) measurement (where some attributes of the traffic and/or network are measured; 2) optimization (where an optimal/near optimal traffic distribution is determined); and 3) control (where the network is reconfigured to implement the desired traffic distribution). The techniques described below can provide improved measurements, which can be utilized to provide improved optimization and control.

Many organizations that have networks are distributed across multiple physical locations. In consequence, their network can include, for example, Local Area Networks (LANs) supporting the local physical locations of the organization and a set of Wide Area Network (WAN) links connecting those local networks to each other.

For example, a large bank or retailer may have multiple physical locations and branches. Each location or branch has a set of LANs. In a traditional configuration, all the branches and locations connect to a few central locations using dedicated WAN links (usually MPLS), and the few central locations connect to the internet using WAN links. Those dedicated WAN links are provided by telecom companies, they offer high availability and quality of service guarantees but have a high monetary cost. Thus, effective traffic engineering is an important factor in providing cost-efficient networking functionality.

Software Defined Networking (SDN) is an approach for managing networks that can be deployed in the above settings in which application program interfaces (APIs) allow decoupling of the datapath (e.g., data forwarding) and the control plane (e.g., protocol intelligence) of network elements. Thus, a network controller (e.g., an entity outside the network element) can have fine grained control and visibility over that network element. This network architecture can be utilized by the network controller to change the policy of network elements dynamically and/or to centralize the control plane and decision making of the network.

The SDN approach is well-suited for network traffic engineering. The SDN APIs usually define both measurement and control and this enables the network controller to measure the network and dictate a distribution of traffic. However, one limitation of SDN is that it assumes tight coupling between the network controller and the network elements. This can work at small to medium scale, but may not scale to larger networks. Its efficiency is also diminished if the network between the network controller and the network elements has limited performance (e.g., low bandwidth and/or high latency). Moreover, the SDN approach usually does not allow crossing of administrative boundaries because different entities can only trust controlled and limited interactions between each other.

Software Defined Wide Area Networking (SD-WAN) proposes to use SDN principles to manage WAN connectivity. This can offer centralized visibility and control over WAN connectivity. Another goal of SD-WAN networking is to reduce cost of WAN connectivity, which can be accomplished by replacing the dedicated WAN links with tunnels over the Internet.

Direct measurement or an SDN-based approach cannot be used for those network paths, because the majority of the network elements of an Internet path are in different administrative domains, and it would be very difficult to obtain a complete list of all those elements and have administrative access to them. For those reasons, path measurement is done via end-to-end network path estimation techniques, by sending probe packets from one end to another.

A key component of traffic engineering is a way to measure the performance of each tunnel. Each tunnel defines a network path across the Internet, the tunneled packets are processed by a number of network elements. The network path used by a tunnel (outside the tunnel) and the network path within a tunnel are logically different (they have different addresses), however those two network paths go through the same network elements, they have in most cases almost the same performance and their performance characteristics are strongly correlated. Therefore, measuring the performance of an Internet tunnel can be done by measuring the network path outside or inside the tunnel, and for the techniques and mechanisms described herein they can be considered the same network path.

Accurate techniques for bandwidth estimation are useful for optimizing end-to-end transport performance, network routing, peer-to-peer file distribution and similar functionalities. Bandwidth estimation is also important for traffic engineering and network capacity planning.

Bandwidth estimation can be performed by, for example, probing the network path with probe packets (that can be specially crafted for the task) sent from one end of the path to the other end of the path. The receiver end can be used to measure the receive time of the packets and changes to the packet delay/time pattern to estimate path characteristics, such as, for example, path capacity, available bandwidth and/or bulk transfer capacity.

Figure 1:
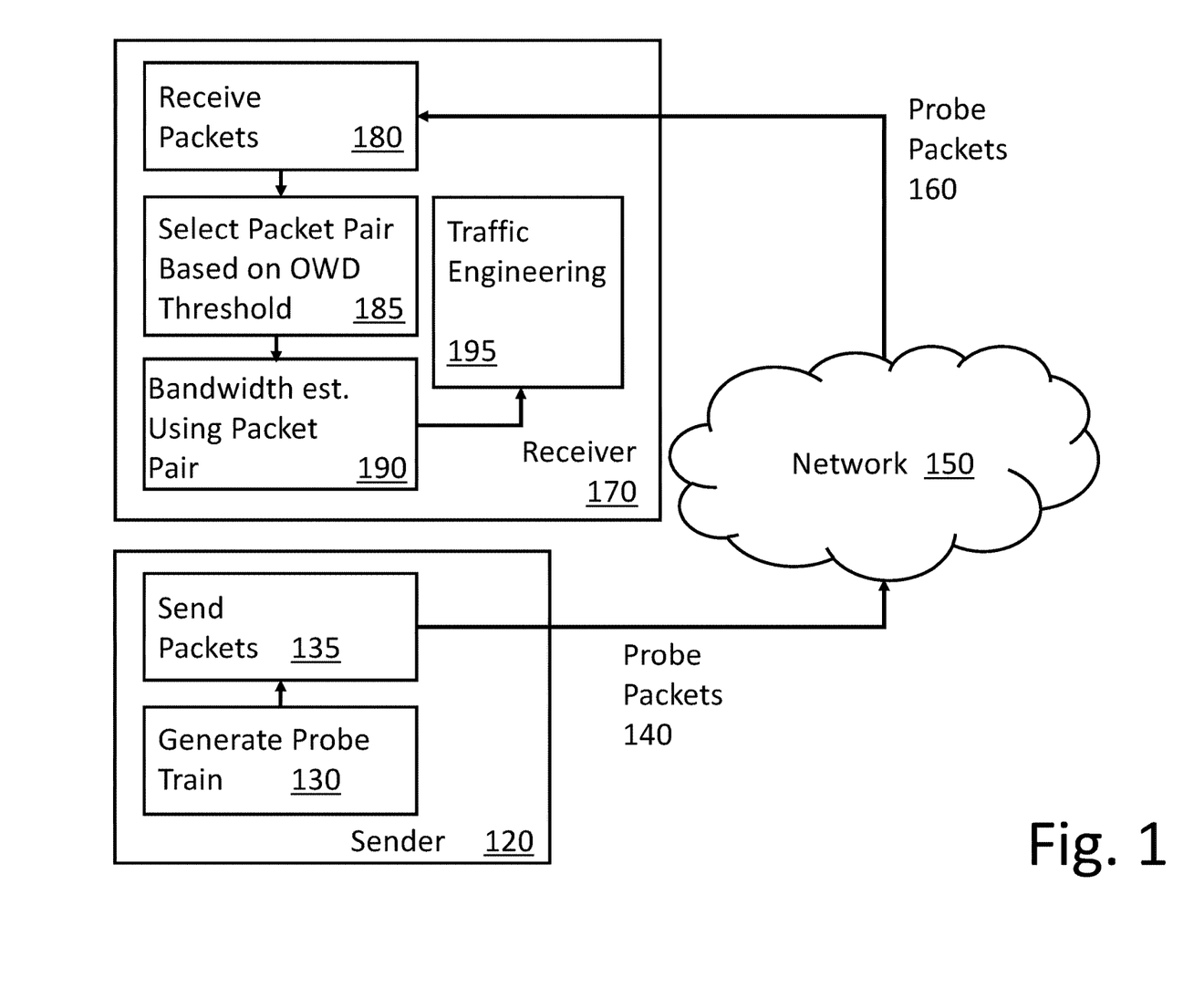
FIG. 1 is a block diagram of one embodiment of an architecture to estimate available bandwidth.

FIG. 1 is a block diagram of one embodiment of an architecture to estimate available bandwidth that can be used in a software defined network (SDN) environment. In the example of FIG. 1, sender 120 generates a probe train 130 and sends the packets 135 over network 150. The packets that are sent by sender 120 are probe packets 140 that move through network 150 to receiver 170.

One or more of probe packets 140 can be lost, delayed or reordered to result in probe packets 160 that are received by receiver 170. When probe packets 160 arrive, receiver 170 receives the packets 180, selects a packet pair based on an OWD threshold value 185 and estimates available bandwidth 190 using the selected packet pair. As described in greater detail below, novel techniques and mechanisms for determining the OWD threshold, selecting the packet pair and estimating available bandwidth are described in greater detail below. In various embodiments, the bandwidth estimates can be used for traffic engineering, 195.

Figure 2:
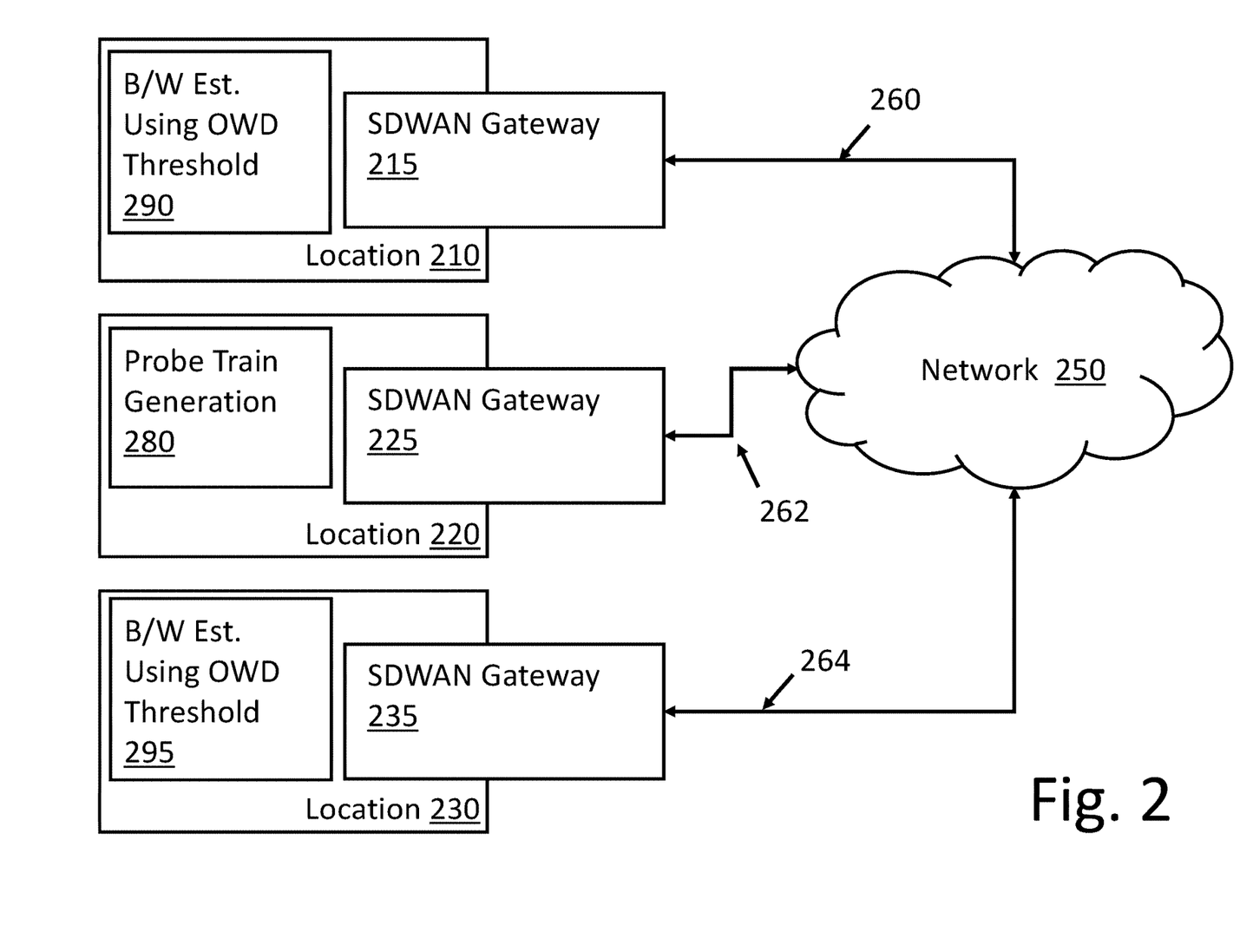
FIG. 2 is a block diagram of one embodiment of a basic SDWAN architecture.

FIG. 2 is a block diagram of one embodiment of a basic SDWAN architecture. As discussed above, cost reduction can be accomplished by replacing dedicated WAN links with tunnels (e.g., 260, 262, 264). In the example above, each branch location (e.g., 210, 220, 230) can replace a proprietary gateway (e.g., T1, X25, MPLS) with a SDWAN gateway (e.g., 215, 225, 235) that creates one or more private tunnels (e.g., virtual private network, or VPN) to connect securely to other branches and locations over WAN links and over the Internet (e.g., 250).

One simple SDWAN implementation is to have an SDWAN gateway (e.g., 215, 225, 235) in each physical location (e.g., 210, 220, 230) with multiple WAN links to the Internet (e.g., 250). The SDWAN gateway can implement tunnel handoff and create parallel tunnels of the internet using each WAN link and then use network traffic engineering to direct traffic to the appropriate tunnel with the goal of optimally using the available network capacity. For example, if the SDWAN gateway detects that a WAN link is down, it can direct traffic away from that WAN link to a tunnel not using that WAN link.

SDWAN gateways (e.g., 215, 225, 235) can also perform more advanced traffic engineering. For example, the gateway can monitor the performance of each tunnel (e.g., in terms of latency and/or throughput) and load balance the traffic or map each traffic type to the appropriate tunnel. One component of traffic engineering in these settings is measurement of performance for each tunnel (e.g., 260, 262, 264).

Each tunnel provides a network path across the Internet and the tunneled packets are processed by multiple network elements. The network path used by a tunnel (outside the tunnel) and the network path within the tunnel are logically different (i.e., they have different addresses), but the two network paths go through the same network elements and have almost the same performance, and their performance characteristics are strongly correlated. Thus, in various embodiments, measuring the performance of an Internet tunnel can be done by measuring the network path outside or inside the tunnel and for the discussion that follows, they can be considered the same path.

The main approach for end-to-end network path estimation is active probing. A device at one end of the path send probe packets to a device at the other end of the path. The packets are only used to estimate bandwidth and do not carry other useful data (beyond the data payload required by the network path estimation process). It is also possible to do passive measurements, either by measuring delays experienced by existing data transmitted over the network path or by modulating that data to have specific characteristics. Another variation is single-ended measurement where the method uses some way to get probe packets reflected back to the sender.

Different methods may estimate different properties of the network path. Bandwidth estimation is a subset of network path estimation. Path capacity is the maximum amount of traffic bandwidth that can be sent if the network path is idle (i.e., without any competing traffic). Bulk Transfer Capacity (BTC) is the bandwidth a Transfer Control Protocol (TCP) connection would get if placed on the network path. Latency is the one-way delay from sender to receiver, and round-trip time (RTT) is the two-way delay.

With active probing, the sender sends a series of probe packet patterns, which can be based on the estimation method to be used and can be configured to trigger specific behaviors from network elements along the path. For example, in many cases the packet pattern is a probe train, the packets and interval between packets are intended to probe various bandwidths across the packet pattern. The receiver measures the received time of the packets, may compute the one-way delay of each packet (i.e., the time taken by the packet to reach the receiver device from the sender device) and examine the changes to the packet pattern. The estimation method uses a simplified network model to convert those measurements into estimates of various network path characteristics.

Thus, the improved bandwidth estimation techniques described herein can be provided to result in an improved SDWAN architecture. A probe train can be generated at a first location (e.g., 220) by the SDWAN gateway (e.g., 225) or other network component (not illustrated in FIG. 2) and can be transmitted to one or more other locations (e.g., 210, 230) and received via the corresponding SDWAN gateway (e.g., 215, 235) wherein congestion metric based bandwidth estimation (e.g., 290, 295) can be generated by the SDWAN gateway (e.g., 215, 235) or other network component (not illustrated in FIG. 2).

The bandwidth estimation information can be shared via network 250 and/or utilized by one or more devices at the location where the estimate was generated. The bandwidth estimation information can be used for traffic engineering and/or for other purposes.

Figure 3:
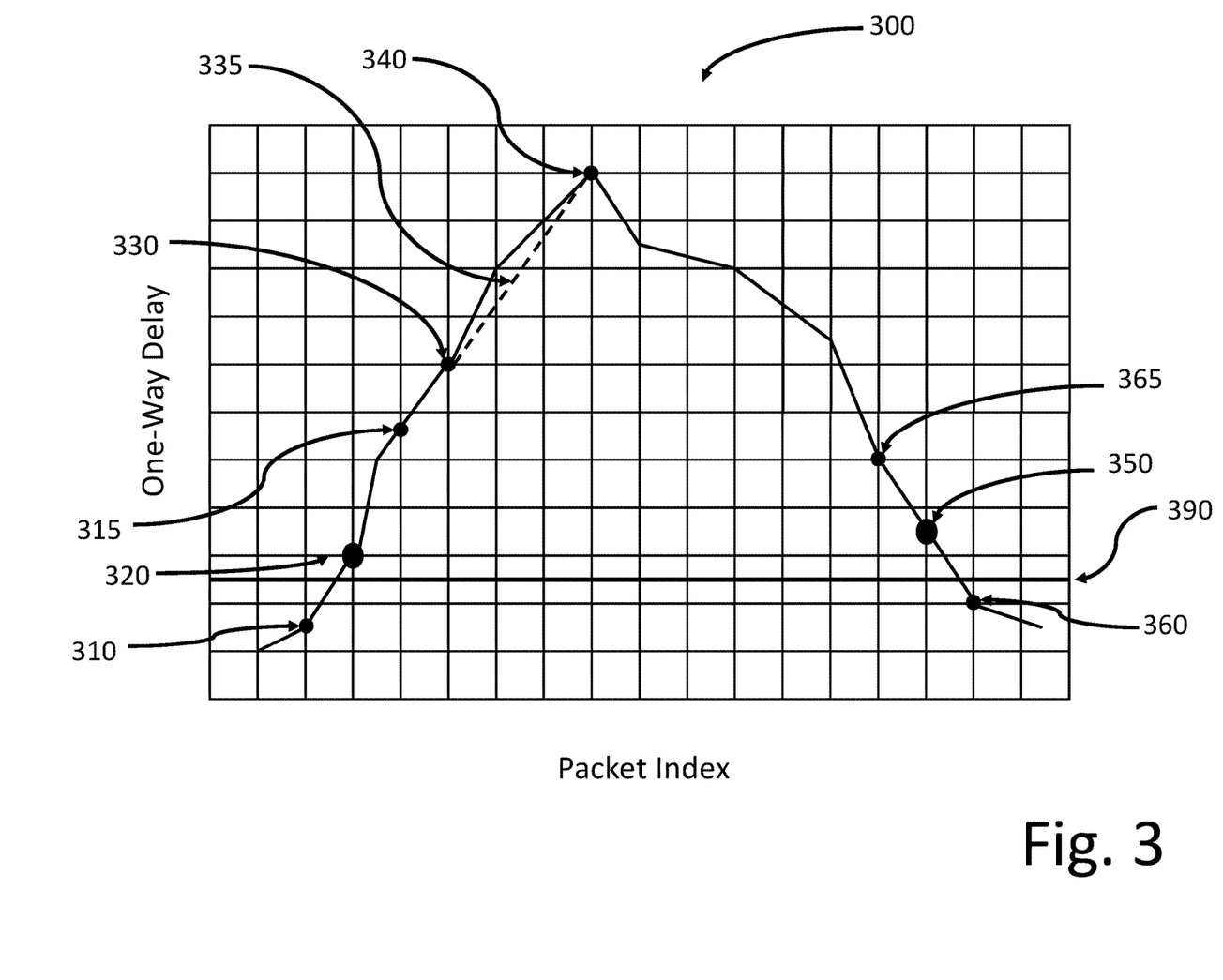
FIG. 3 is an example graph conceptually illustrating one-way delay (OWD) for packets of a probe train.

FIG. 3 is an example graph conceptually illustrating one-way delay (OWD) for packets of a probe train. In various embodiments, a bump detection algorithm (BDA) is utilized as part of the process of selecting a packet pair from a train of packets configured to cause OWD bump 300 to use for bandwidth estimation. The goal of the BDA is to select a pair of packets with similar congestion on both sides of the congestion peak. The pair of packets selected is then used to estimate the available bandwidth, therefore the quality of the available bandwidth estimate is only as good as the selection of the packets using the BDA.

The OWD for a packet is mostly governed by the propagation delay of the network path, the transmission time of the slowest link of the path and the accumulated queuing delay in all the network elements in the path. Thus, for each packet the OWD can be:

$$OWD(i)=pd+st(size)+sum(qd(e,i))$$

Where "pd" is the total propagation delay, "st(size)" is the slowest transmission time for this packet size, and "qd(e,i)" is the queuing delay at element 'e' for packet 'i'. These PRM techniques assume a fairly simple queuing model where qd(e,i) is generally a function of the congestion at element 'e' when packet 'i' arrives.

Because the sender and the receiver are using different clocks to measure departure and arrival times, those clocks may not be perfectly synchronized. Therefore, it is difficult to accurately measure the OWD of packets. Fortunately, in most cases, the absolute OWD of the packet does not matter and only the difference between the OWDs of different packets matters. Over the short time of a probe train clock drift is negligible and the difference between OWDs can be sufficiently accurate.

An increase in OWD in the probe train in theory indicates increased congestion, however in reality OWD measurement are very noisy. This noise is mainly due to the imperfection and non-ideal behavior of the various network elements and other packet scheduling constraints. Additional OWD noise is due to imperfect scheduling (Inter-Departure Time, or IDT noise), and errors in the measurement of received time. Such noise in the OWD directly impacts the BDA algorithm. Noisy OWD values may lead the BDA to select two packets with similar OWD that in reality did not experience the same level of congestion, or packets that are not part of the same congested period. This leads to improper available bandwidth estimate.

The probe train has a decreasing rate, therefore it first creates congestion on the network path (by sending packets at a rate higher than the bottleneck), and then decongests the network path (by sending packets at a rate lower than the bottleneck). This means that across the probe train, first the OWD of packets goes up (congestion) and then down (decongestion). The peak (340) of the bump in OWD represents the time of maximum congestion, and packets with similar OWD should have experienced similar congestion (similar amount of queuing).

Further, the BDA should select packets parts of the same congestion period. If the packets are not part of the same congestion period, it means that there is some idle time between those two packets, and in this case not much can be said apart from the fact that the rate of packets is lower than the available bandwidth. If two packets are part of the same congestion period and have similar congestion, the overall rate of probes between these two packets have a fairly neutral contribution to congestion, which means the overall rate of probes is close to the available bandwidth and therefore can be used as an estimate of the available bandwidth.

Congestion bump 300 is composed of OWD values for many packets, and there are many choices of packets that have similar OWD. The BDA may be utilized to select packets high in the bump (packets with higher OWD) or lower in the bump (packets with lower OWD). If the BDA selects packets too low in the bump (e.g., 310, 360), where OWD is close to its uncongested value, congested packets cannot be distinguished from uncongested packets and the selected packets may not be in the same congestion period.

Conversely, picking packets higher in the bump (e.g., 315, 365) is problematic. The assumption that packets with similar OWD should have experienced similar congestion is only true at the onset of congestion, and very low levels of congestion. Some bottlenecks with cross traffic do not have symmetric behavior when going into congestion and decongestion, and in those cases, for medium to high congestion, packets with similar OWD have not experienced similar congestion. Further, to avoid issue with the granularity of OWD, and to have a better averaging over time, it is better to pick a pair of packets which is as far apart as possible, which equate to lower in the bump (e.g., 320, 350).

PathCos++ and SLDRT use different strategy in their BDA. PathCos++ tries to find the widest spaced pair of points with similar OWD on both sides of the bump. The assumption is that similar OWD indicates similar congestion. SLDRT uses the first packet of the train as the first packet of the pair. If then measures the minimum OWD minOWD, and defines a threshold:

$$thrOWD=minOWD+100 \text{ us}$$

SLDRT picks for the second packet of the pair the packet immediately before the first packet below the threshold.

As described in greater detail below, and average OWD value can be utilized to be (or to generate) OWD threshold 390. In some embodiments, the OWD threshold can be the average OWD (e.g., 335) of packets (e.g., 330, 340) higher in bump 300. In some embodiments, OWD for packets on the increasing side of bump 300 are utilized.

A new OWD increase threshold is defined based on the strength of the congestion. The BDA will prefer a pair of packets that have an OWD larger than the OWD increase threshold. This can result in a reduction of the impact of OWD noise, which can improve available bandwidth estimation accuracy. Packet pair selection based on the OWD threshold described herein can be effective with existing BDAs or can be utilized with a new packet selection strategy.

Conceptually, packets a few OWDs away from the base of the bump are selected. The average per-packet OWD increase due to congestion is measured, avg-pkt-incr-OWD. In one embodiment, the OWD threshold is defined as a number of increases over the minimum OWD.

$$thrOWD = minOWD + k*(incrOWD)$$

The distribution of OWD is not Gaussian, there is an absolute limit to how small the OWD can be, when there is no queuing, and when the network is not congested the average OWD is close to this minimal OWD. This means that the minimal OWD is fairly stable.

There are multiple ways to measure the minimum OWD delay. One solution is to measure the minimum OWD across the whole received chirp train. Another solution is to measure the minimum OWD only on a part of the received chirp train, for example only on the uncongested part of the chirp train (last part). Lastly, the minimum OWD may be measured across multiple chirp trains, for example by taking the average or minimum of multiple chirp trains.

Measuring the average per-packet OWD increase due to congestion is more complicated. For each packet, the OWD increase depends on the difference between the sending rate and the available bandwidth. The amount of OWD increase will also depend on the type of bottleneck (hard versus soft). Further, OWD is noisy, so measuring OWD increase will suffer from this noise.

In one embodiment, the goal is to estimate the OWD increase at the leading base of the bump, which for most chirp trains (PathCos++, SLDRT) means the first few packets of the chirp train. In some embodiments, the chirp train utilized can start with a short ramp up, in this case the leading base of the bump may be just after the first few packets of the chirp train.

In some embodiments, the chirp train can include a portion sent consistently at the maximum rate (e.g., one third). This portion of the chirp train presents consistent conditions, so in theory the OWD increase should be the same for all packets of this section. The average OWD increase can be measured across this section, and will be a good estimate of incrOWD. The average is the total OWD increase across the section divided by the number of packets in that section. The leading part of the bump is very noisy, so it is usually better to take a later part of this section of the chirp train. In some embodiments, the average increase both for the full first part of the train (e.g., ramp up and portion at maximum rate) and a subset of the first part (e.g., last two-thirds of the portion at maximum rate) can be determined, and the larger of the two measures can be used for minOWD.

If the chirp train does not contain a long section sent at maximum rate, such as the chirp train of PathCos++, the total OWD increase can be compensated for by using the difference of rate of each packet and the rate of the start of the chirp train.

The amount of increase, k, is usually a small constant. In some embodiments, a value of k=2 can be used, which means that the threshold is equivalent of two packet increases over the minimum OWD. The number of increases can be dynamic in some embodiments.

At this point, some BDA embodiments can filter out candidate packet pairs that do not meet the bump filter (e.g., based on the bump highest OWD, the bump height and width), and if there are any remaining pairs, the widest pairs can be selected. In some embodiments, an improved BDA technique can function to compare the OWD of the end packet of the pair to the OWD increase threshold. If there are pairs of packets that meet the bump filter and for which the OWD of the end packet is higher than the OWD increase threshold, the widest packet pair can be selected. Otherwise, if there are pairs of packets that meet the bump filter but none have the OWD of the end packet higher than the OWD threshold, the packet pair with the highest OWD can be selected. The selected packet pair can then be used for available bandwidth estimation.

Thus, according to various embodiments described herein, the OWD threshold value can be adapted to the strength of the congestion by measuring the typical OWD increase in the congestion bump. However, as described above, the OWD threshold value does not adapt to noise within the congestion bump. The following techniques can be utilized to adapt to the noise.

First, the noise is measured. In some embodiments, measuring the noise outside of the congestion bump is not useful as noise within the congestion and noise outside of the congestion can be unrelated. Under certain conditions, it may be difficult to separate the contribution of the congestion and the noise as some congestion may have complex behavior.

Generally, the main source of OWD noise is from Interrupt Coalescence, which is typically more frequent and much stronger than other sources of noise. Interrupt Coalescence occurs in the receiver network interface card (NIC) and can cause packet batching. The effect of Interrupt Coalescence can be measured as part of batching mitigation as discussed above. In some embodiments packets per batch (PPB) can be measured to provide the typical number of packets in a batch (or per interrupt). In one embodiment, PPB is a statistic based on a largest group of packets batched together across multiple chirp trains. With batching mitigation, multiple packets can be sent per probe, and the number of packets per probe (PPP) can be measured as PPB or statically configured (PPPC).

Conceptually, the packet batching noise measurement can be integrated into the OWD threshold value calculation via the number of increases. PPB indicates the typical number of packets batched, the OWD noise between the first and last packet of that batch is roughly equal to PPB multiplied by the average OWD increase. To eliminate that noise, the OWD threshold value should be greater than the value of that noise. Thus, the OWD threshold value can be related to the OWD increase of a typical batch of packets rather than related to a fixed number of packets, as the batch is the logical increment by which batching mitigation selects packets to be used for ABW estimation.

In some embodiments, the modification of the number of packet increases, k, can be:

$$k = 1 + PPB$$

or $k=1+\text{PPPC}$ depending on the configuration being used. The advantage is that, when there is no batching, PPB or PPPC is zero, and k=2, which is the same value used before, and for high batching, k is approximately equal to PPB or PPPC, the batching size, which is an optimal value in that case. Other techniques can also be used.

Thus, a BDA or similar technique can be used to measure or estimate packet congestion on a network path. The average per-packet OWD increase due to congestion for a portion of a probe/chirp train can be determined. An OWD threshold can be computed based on a minimum OWD and a number of OWD increases. In some embodiments, then number of OWD increase can be computed based on a noise measurement. In some embodiments, then number of OWD increases can be computed based on a typical number of packets received batched together. When selecting a packet pair to be used for available bandwidth estimation, preference can be given to packet pairs that have OWD higher than the computed OWD threshold. Available bandwidth can be estimated from the selected packet pair.

These techniques can improve the selection of packet pairs and provide much better available bandwidth estimates. They can eliminate or reduce the effects of OWD noise at the base of the observed bump and produce more stable available bandwidth estimates. Better available bandwidth estimates in turn provide improved traffic engineering for most network, especially in SD-WAN networks.

Figure 4:
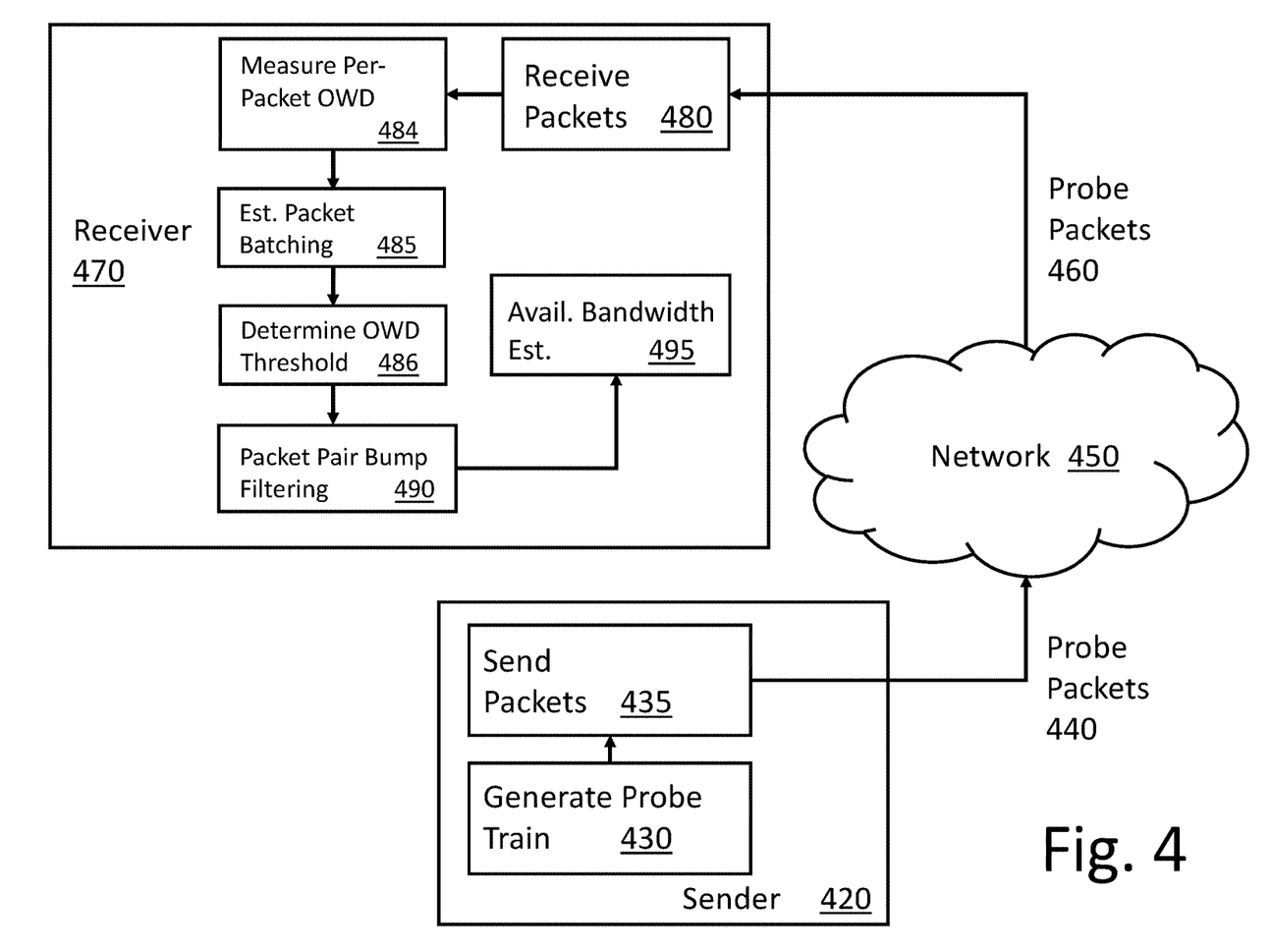
FIG. 4 is a block diagram of one embodiment of an architecture that can estimate available bandwidth as described herein.

FIG. 4 is a block diagram of one embodiment of an architecture that can estimate available bandwidth as described herein. In some embodiments, the elements of FIG. 4 can be part of an SDWAN as described above. In other embodiments, other network configurations can be utilized.

In the example of FIG. 4, sender 420 communicates with receiver 470 over network 450. Sender 420 can generate probe train 430 and send packets 435 to cause probe packets 440 to be sent over network 450, which can be, for example, the Internet.

Probe packets 440 move through network 450 to receiver 470. One or more of probe packets 440 can be lost or delayed to result in probe packets 460 that are received by receiver 470. When probe packets 460 arrive, receiver 470 receives the packets 480 and measures a per-packet OWD for the received packets, 484, using the techniques and architectures described above. Receiver 470 can then estimate packet batching, 485 and determine the OWD threshold, 486, using the techniques and architectures described above. The OWD threshold value can be utilized for packet pair bump filtering, 490, as described above, for example, with respect to FIG. 3.

Available bandwidth estimates can be generated, 495, utilizing the OWD threshold value and the per-packet OWD for one or more of the received probe packets and the packet pair bump filtering. The available bandwidth estimate(s) can be used for traffic engineering operations, etc.

Figure 5:
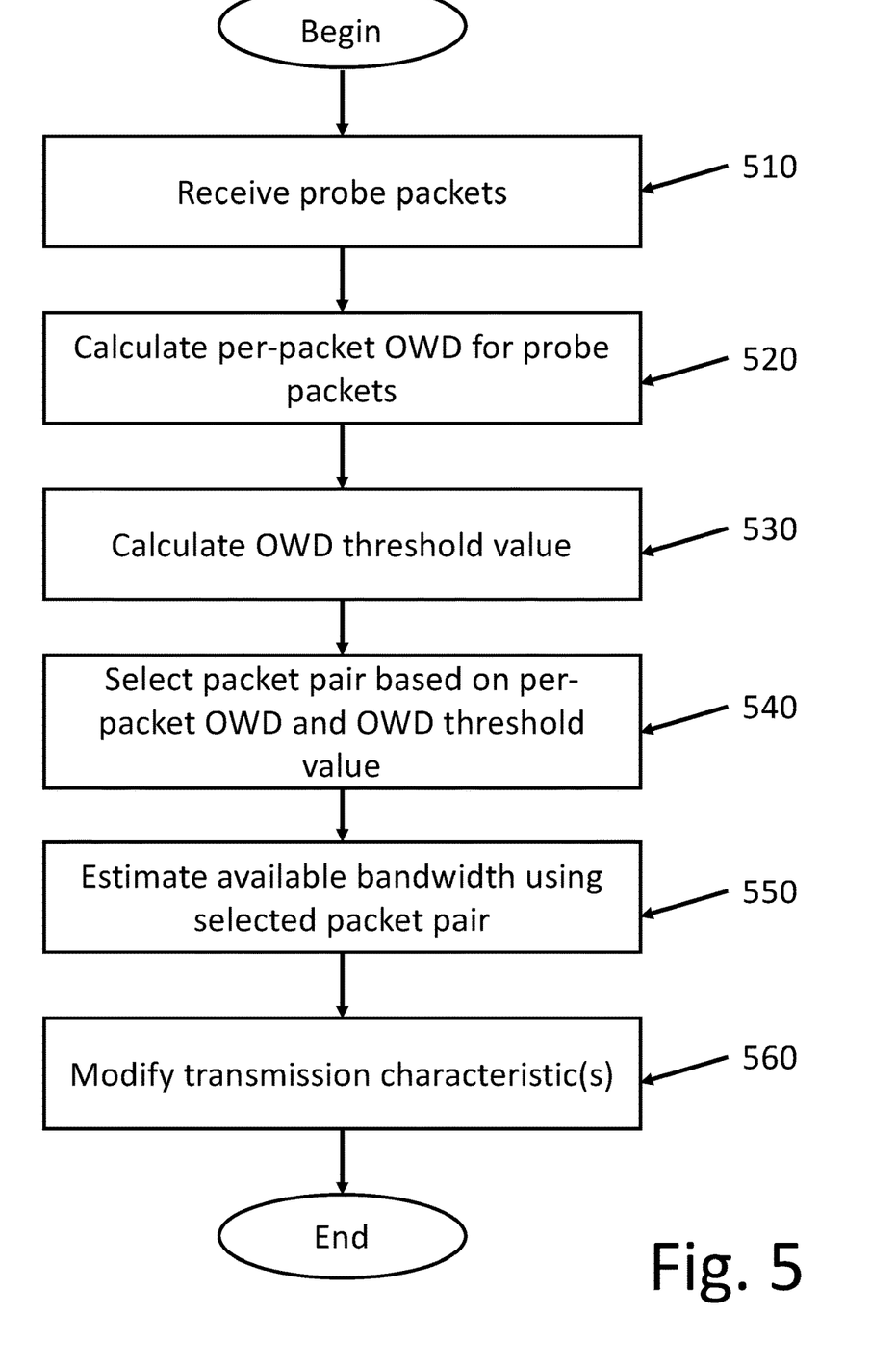
FIG. 5 is a flow diagram of one embodiment of a technique to estimate available bandwidth as described herein.

FIG. 5 is a flow diagram of one embodiment of a technique to estimate available bandwidth as described herein. The technique described with respect to FIG. 5 can utilize one or more of the techniques for estimating network congestion discussed above and can be implemented by one or more of the devices (or network components) discussed herein.

One or more probe packets are received, 510. In one embodiment, the probe packets are received by an SDWAN gateway (or other SDWAN device) via a network interface. The probe packets can be generated by, for example, a remote device having access to the SDWAN network (e.g., another SDWAN gateway). In some embodiments, the SDWAN gateway (or other SDWAN device) has traffic engineering capability to change transmit and/or receive characteristics/settings/configurations/etc. in response to available bandwidth and/or other network measurements.

The per-packet OWD can be calculated for the received probe packets, 520. The per-packet OWD values can be used to calculate an OWD threshold value as described above (e.g., 290 of FIG. 2). The OWD threshold value can be used in a strategy to select a packet pair to be used for available bandwidth estimation purposes, 540. Bandwidth estimation can be performed using the selected packet pair, 550.

One or more network transmission characteristics can be modified based on the estimated available bandwidth, 560. This is an optional operation and the estimated available bandwidth can be used for other purposes. Various network transmission characteristics (e.g., path selection, queue depth, queue type) can be selected/modified based on the estimated available bandwidth. Alternatively, the estimated available bandwidth can be shown to a user or administrator, as part of a network management tool, as part of a web page, or in a diagnostic tool/log, for example.

Figure 6:
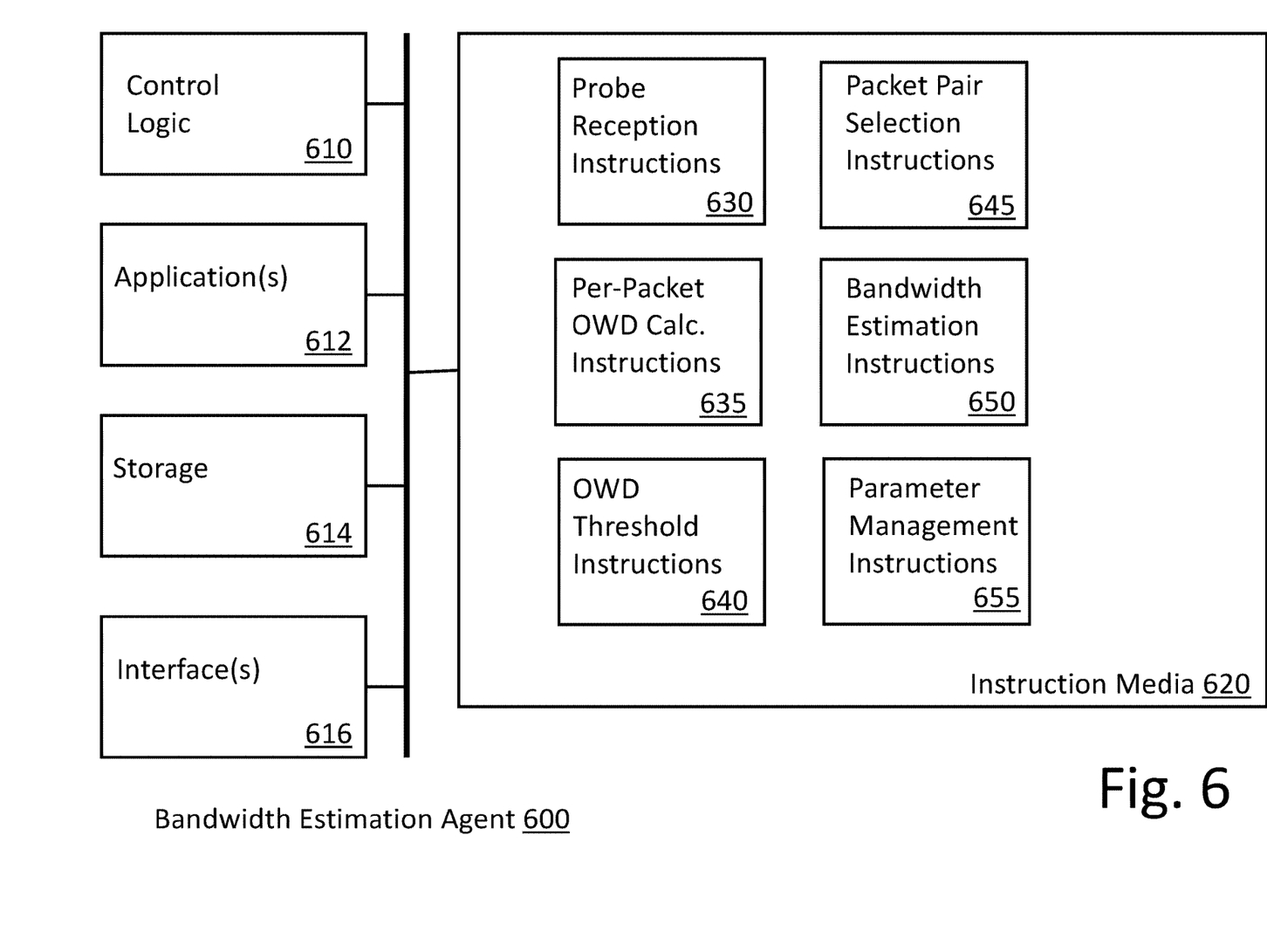
FIG. 6 is a block diagram of one embodiment of a functional agent that can estimate available bandwidth as described herein.

FIG. 6 is a block diagram of one embodiment of a functional agent that can estimate available bandwidth as described herein. In one embodiment, one or more bandwidth estimation agents may exist and/or operate within the host (e.g., SDWAN) network. The agent of FIG. 6 may provide functionality as described, for example, with respect to FIGS. 1-5. The agent of FIG. 6 may also provide additional functionality.

In one embodiment, bandwidth estimation agent 600 includes control logic 610, which implements logical functional control to direct operation of bandwidth estimation agent 600, and/or hardware associated with directing operation of bandwidth estimation agent 600. Logic may be hardware logic circuits and/or software routines. In one embodiment, bandwidth estimation agent 600 includes one or more applications 612, which represent a code sequence and/or programs that provide instructions to control logic 610.

Bandwidth estimation agent 600 includes storage 614, which represents a memory device and/or access to a memory resource for storing data and/or instructions. Storage 614 may include memory local to bandwidth estimation agent 600, as well as, or alternatively, including memory of the host system on which bandwidth estimation agent 600 resides. Bandwidth estimation agent 600 also includes one or more interfaces 616, which represent access interfaces to/from (an input/output interface) bandwidth estimation agent 600 with regard to entities (electronic or human) external to bandwidth estimation agent 600.

Bandwidth estimation agent 600 also includes instruction media 620, which represents one or more instructions storage media (e.g., internal random access memory, optical storage) for functions or modules that enable bandwidth estimation agent 600 to provide the bandwidth estimation functionality as described above. The example of FIG. 6 provides several modules that may be included in instruction media 620; however, different and/or additional modules may also be included.

Example instruction modules that may be involved in providing bandwidth estimation functionality described herein include, for example, probe reception instructions 630, per-packet OWD calculation instructions 635, OWD threshold instructions 640, packet pair selection instructions 645, bandwidth estimation module 650 and/or parameter management module 655.

In various embodiments, probe reception instructions 630, when executed, cause control logic 610 to receive one or more packets of a probe train. Control logic 610 can receive the packets through, for example, interface(s) 616. Probe reception instructions 630 can include instructions to manage one or more queues (not illustrated in FIG. 6) and/or can use storage 614. In some embodiments, probe reception instructions 630 can function to receive packets that are not probe packets also.

In various embodiments, per-packet OWD calculation instructions 635, when executed, cause control logic 610 to determine per-packet OWD for one or more packets in the probe train. Per-packet OWD calculation instructions 635 can be function with probe reception instructions and/or memory 614 to process the packets. Various techniques can be used to determine per-packet OWD are described above.

In various embodiments, OWD threshold instructions 640, when executed, cause control logic 610 to determine an OWD threshold value. Various techniques for determining OWD threshold values are described above. OWD threshold instructions 640 can be function with probe reception instructions 630 and/or memory 614 to process the packets.

In various embodiments, packet pair selection instructions 645, when executed, cause control logic 610 to select a pair of probe packets based on the per-packet OWD information and the OWD threshold value as determined by per-packet OWD calculation instructions 635 and OWD threshold instructions 640.

In various embodiments, bandwidth estimation module 650, when executed, cause control logic 610 to determine an estimated available bandwidth based, at least in part, on the packet pair as selected by packet pair instructions 645.

In various embodiments, parameter management instructions 655, when executed, cause control logic 610 to manage one or more parameters associated with network packet communications. One or more network transmission characteristics (e.g., path selection, queue depth, queue type) can be modified based on the estimated available bandwidth.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

In the preceding description, numerous specific details are set forth. However, embodiments of the invention may be practiced without these specific details. In other instances, well-known structures and techniques have not been shown in detail in order not to obscure the understanding of this description.

What is claimed is:

1. A non-transitory computer-readable medium having stored thereon sequences of instructions that, when executed by one or more processors, are configurable to cause the one or more processors to:
   receive a train of probe packets, via a network interface, from a remote electronic device;
   calculate a one-way delay (OWD) threshold value based on a calculated OWD increase between at least a first pair of packets from the train of probe packets;
   calculate a per-packet OWD for at least a second pair of packets from the train of probe packets;
   select a packet pair from the train of probe packets based on the per-packet OWD and the OWD threshold value;
   compute an estimated available bandwidth based on one or more transmission characteristics of the selected packet pair.

2. The non-transitory computer-readable medium of claim 1, wherein the estimated available bandwidth is utilized for network traffic engineering or network traffic diagnostics.

3. The non-transitory computer-readable medium of claim 1, wherein the selecting the packet pair from the train of probe packets based on the per-packet OWD and the OWD threshold value comprises utilizing a bump detection algorithm (BDA) to measure congestion on a network path.

4. The non-transitory computer-readable medium of claim 1, wherein calculating the OWD threshold value comprises computing an average per-packet OWD increase due to congestion for packets from the train of probe packets.

5. The non-transitory computer-readable medium of claim 4, wherein the calculating the OWD threshold value based on the calculated OWD for the at least two packets from the train of probe packets comprises at least:
   computing the OWD threshold value based on a minimum OWD and a number of OWD increase.

6. The non-transitory computer-readable medium of claim 5, wherein the number of OWD increase is based on a packet noise measurement.

7. The non-transitory computer-readable medium of claim 5, wherein the number of OWD increase is based on either an expected packet per batch (PPB) value or an expected packet per interrupt value.

8. A system comprising:
   a network interface to receive a train of probe packets from a remote electronic device;
   a memory device coupled with the network interface to at least store one or more packets from the train of probe packets, and to store one or more parameters associated with the one or more packets from the train of probe packets;
   at least one hardware processor coupled with the network interface and with the memory device, the at least one hardware processor to calculate a one-way delay (OWD) threshold value based on a calculated OWD increase between at least a first pair of packets from the train of probe packets, to calculate a per-packet OWD for at least a second pair of packets from the train of probe packets, to select a packet pair from the train of probe packets based on the per-packet OWD and the OWD threshold value and to compute an estimated available bandwidth based on one or more transmission characteristics of the selected packet pair.

9. The system of claim 8, wherein the estimated available bandwidth is utilized for network traffic engineering or network traffic diagnostics.

10. The system of claim 8, wherein the selecting the packet pair from the train of probe packets based on the per-packet OWD and the OWD threshold value comprises utilizing a bump detection algorithm (BDA) to measure congestion on a network path.

11. The system of claim 8, wherein calculating the OWD threshold value comprises computing an average per-packet OWD increase due to congestion for packets from the train of probe packets.

12. The system of claim 11, wherein the calculating the OWD threshold value based on the calculated OWD for the at least two packets from the train of probe packets comprises at least:
   computing the OWD threshold value based on a minimum OWD and a number of OWD increase.

13. The system of claim 12, wherein the number of OWD increase is based on a packet noise measurement.

14. The system of claim 12, wherein the number of OWD increase is based on either an expected packet per batch (PPB) value or an expected packet per interrupt value.

15. A method comprising:
   receiving, via a network interface of a host electronic system, a train of probe packets, via a network interface, from a remote electronic device;
   calculating a one-way delay (OWD) threshold value based on a calculated OWD increase between at least a first pair of packets from the train of probe packets;
   storing, in a memory coupled with the hardware processor, at least the calculated OWD threshold value;
   calculating a per-packet OWD for at least a second pair of packets from the train of probe packets;
   storing, in the memory coupled with the hardware processor, at least the per-packet OWD for the second pair of packets;
   selecting, with the hardware processor of the host electronic system, a packet pair from the train of probe packets based on the per-packet OWD values and the OWD threshold value;
   computing, with the hardware processor of the host electronic system, an estimated available bandwidth based on one or more transmission characteristics of the selected packet pair.

16. The method of claim 15, wherein the estimated available bandwidth is utilized for network traffic engineering or network traffic diagnostics.

17. The method of claim 15, wherein the selecting the packet pair from the train of probe packets based on the per-packet OWD and the OWD threshold value comprises utilizing a bump detection algorithm (BDA) to measure congestion on a network path.

18. The method of claim 15, wherein calculating the OWD threshold value comprises computing an average per-packet OWD increase due to congestion for packets from the train of probe packets.

19. The method of claim 15, wherein the number of OWD increase is based on a packet noise measurement.

20. The method of claim 15, wherein the number of OWD increase is based on either an expected packet per batch (PPB) value or an expected packet per interrupt value.

* * * * *